(12) United States Patent
Haapanen

(10) Patent No.: US 11,494,141 B2
(45) Date of Patent: Nov. 8, 2022

(54) CONFIGURING PRINTING DEVICES USING A MOBILE DEVICE THAT RECEIVES AND DISPLAY DATA THAT IDENTIFIES A PLURALITY OF CONFIGURATIONS FOR A PRINTING DEVICE AND INDICATES THAT THE CURRENT CONFIGURATION OF THE PRINTING DEVICE HAS CHANGED FROM A PRIOR CONFIGURATION

(71) Applicant: Tom Haapanen, Kitchener (CA)

(72) Inventor: Tom Haapanen, Kitchener (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/805,655

(22) Filed: Feb. 28, 2020

(65) Prior Publication Data

US 2021/0271436 A1 Sep. 2, 2021

(51) Int. Cl.
*G06F 3/12* (2006.01)

(52) U.S. Cl.
CPC .......... *G06F 3/1253* (2013.01); *G06F 3/1205* (2013.01); *G06F 3/1222* (2013.01); *G06F 3/1232* (2013.01); *G06F 3/1254* (2013.01); *G06F 3/1255* (2013.01)

(58) Field of Classification Search
None
See application file for complete search history.

(56) References Cited

U.S. PATENT DOCUMENTS

| | | | |
|---|---|---|---|
| 6,693,722 B1 | 2/2004 | Mixer, Jr. | |
| 6,814,510 B1 | 11/2004 | Sabbagh | |
| 8,291,312 B1 | 10/2012 | Zhou | |
| 10,791,246 B2* | 9/2020 | Kato | H04N 1/32529 |
| 2006/0023246 A1 | 2/2006 | Vidyanand | |
| 2007/0146733 A1 | 6/2007 | Kennis | |
| 2007/0229873 A1* | 10/2007 | Kato | G06F 21/608 |
| | | | 358/1.14 |
| 2011/0128572 A1 | 6/2011 | Hosotsubo | |
| 2011/0222114 A1 | 9/2011 | Wakabayashi | |
| 2011/0258299 A1 | 10/2011 | Herlein | |
| 2012/0233299 A1 | 9/2012 | Attanasio | |

(Continued)

FOREIGN PATENT DOCUMENTS

| | | |
|---|---|---|
| EP | 2759924 | 7/2014 |
| JP | 2019/006099 | 1/2019 |
| JP | 2021096396 A | 6/2021 |

OTHER PUBLICATIONS

Haapanen, U.S. Appl. No. 16/805,654, filed Feb. 28, 2020, Office Action, dated Feb. 1, 2021.

(Continued)

*Primary Examiner* — Haris Sabah
(74) *Attorney, Agent, or Firm* — Hickman Becker Bingham Ledesma LLP; Edward A. Becker

(57) ABSTRACT

An approach is provided for configuring printing devices using a mobile device. The mobile device acquires, from a configuration manager, data that identifies a plurality of configurations available for a printing device. The mobile device displays the data and a user selects a configuration for the printing device. The mobile device causes the selected configuration to be applied to the printing device.

17 Claims, 8 Drawing Sheets

(56) References Cited

U.S. PATENT DOCUMENTS

| | | | |
|---|---|---|---|
| 2013/0128305 A1* | 5/2013 | Grabkowitz | H04N 1/00973 358/1.15 |
| 2013/0163041 A1* | 6/2013 | Sato | H04N 1/32122 358/1.15 |
| 2013/0235407 A1 | 9/2013 | Kobayashi | |
| 2014/0126016 A1* | 5/2014 | Namihira | G06F 21/31 358/1.15 |
| 2014/0240739 A1* | 8/2014 | Hattori | G06F 3/1239 358/1.13 |
| 2014/0355067 A1 | 12/2014 | Asahara | |
| 2015/0172484 A1* | 6/2015 | Kanno | H04N 1/0097 358/1.13 |
| 2015/0264198 A1 | 9/2015 | Kamiya | |
| 2015/0286452 A1* | 10/2015 | Kim | H04N 1/00103 358/1.13 |
| 2016/0306596 A1* | 10/2016 | Yasuda | G06F 3/1292 |
| 2017/0243272 A1 | 8/2017 | Zakharov | |
| 2018/0359379 A1* | 12/2018 | Igawa | G06F 3/1285 |
| 2019/0087138 A1 | 3/2019 | Suzuki | |
| 2021/0271430 A1 | 9/2021 | Haapanen et al. | |
| 2021/0271437 A1 | 9/2021 | Haapanen et al. | |

OTHER PUBLICATIONS

Haapanen, U.S. Appl. No. 16/805,651, filed Feb. 28, 2020, Office Action, dated May 21, 2021.

Haapanen, U.S. Appl. No. 16/805,654, filed Feb. 28, 2020, Notice of Allowance, dated Aug. 11, 2021.

Haapanen, U.S. Appl. No. 16/805,654, filed Feb. 28, 2020, Notice of Allowance and Fees Due, dated Sep. 2, 2021.

Haapanen, U.S. Appl. No. 16/805,651, filed Feb. 28, 2020, Advisory Action, dated Jan. 24, 2022.

Haapanen, U.S. Appl. No. 16/805,651, filed Feb. 28, 2020, Final Rejection, dated Sep. 20, 2021.

The International Searching Authority, "Search Report" in Application No. PCT/JP2021/000689, dated Apr. 6, 2021, 15 pages.

* cited by examiner

FIG. 4A

Configuration Selection Data 400

Configuration Data 430

Printing Device Data 450

FIG. 4B

Configuration Selection Data 400

| Customer | Printing Device Type | Configuration |
|---|---|---|
| Customer A | Type 1 | C1, C1MS |
| | Type 2 | C2 |
| | Type 3 | C3 |
| Customer B | Type 1 | Custom B-C1 |
| | Type 2 | C2 |
| | Type 3 | C3 |
| Customer C | Type 1 | C1HS, C2, C3 |
| | Type 2 | Custom C-C2 |
| | Type 3 | C3, C2 |
| No Assigned Customer | Type 1 | C1 |
| | Type 2 | C2 |
| | Type 3 | C3 |

Configuration Key:
C1, C1MS, C1HS, C2, C3 = standard configurations
Custom B-C1, Custom C-C2 = customer-specific configurations

FIG. 4C

Printing Device Data 450

| Serial Number | Type | Customer ID | Configuration |
|---|---|---|---|
| SN1 | Type 1 | Customer A | C1 |
| SN2 | Type 2 | Customer B | C2 |
| SN3 | Type 1 | Customer C | C1 |
| SN4 | Type 3 | Customer C | C3 |
| SN5 | Type 2 | Customer C | Customer C-C2 |
| SN6 | Type 1 | Customer B | Customer B-C1 |
| SN7 | Type 1 | Customer A | |
| SN8 | Type 1 | Customer C | C1MS |
| SN9 | Type 2 | Customer A | C2 |
| SN10 | Type 3 | Customer A | C3 |
| SN11 | Type 2 | Customer B | C2 |
| SN12 | Type 2 | Customer A | |
| SN13 | Type 1 | Customer A | C1 |
| SN14 | Type 1 | Customer A | C1 |
| SN15 | Type 3 | Customer C | |
| SN16 | Type 2 | Customer C | |
| SN17 | Type 3 | Customer B | |

Configuration Key:

C1, C2, C3 = standard configurations

Customer B-C1, Customer C-C2 = customer-specific configurations

Blank = printing device not yet configured

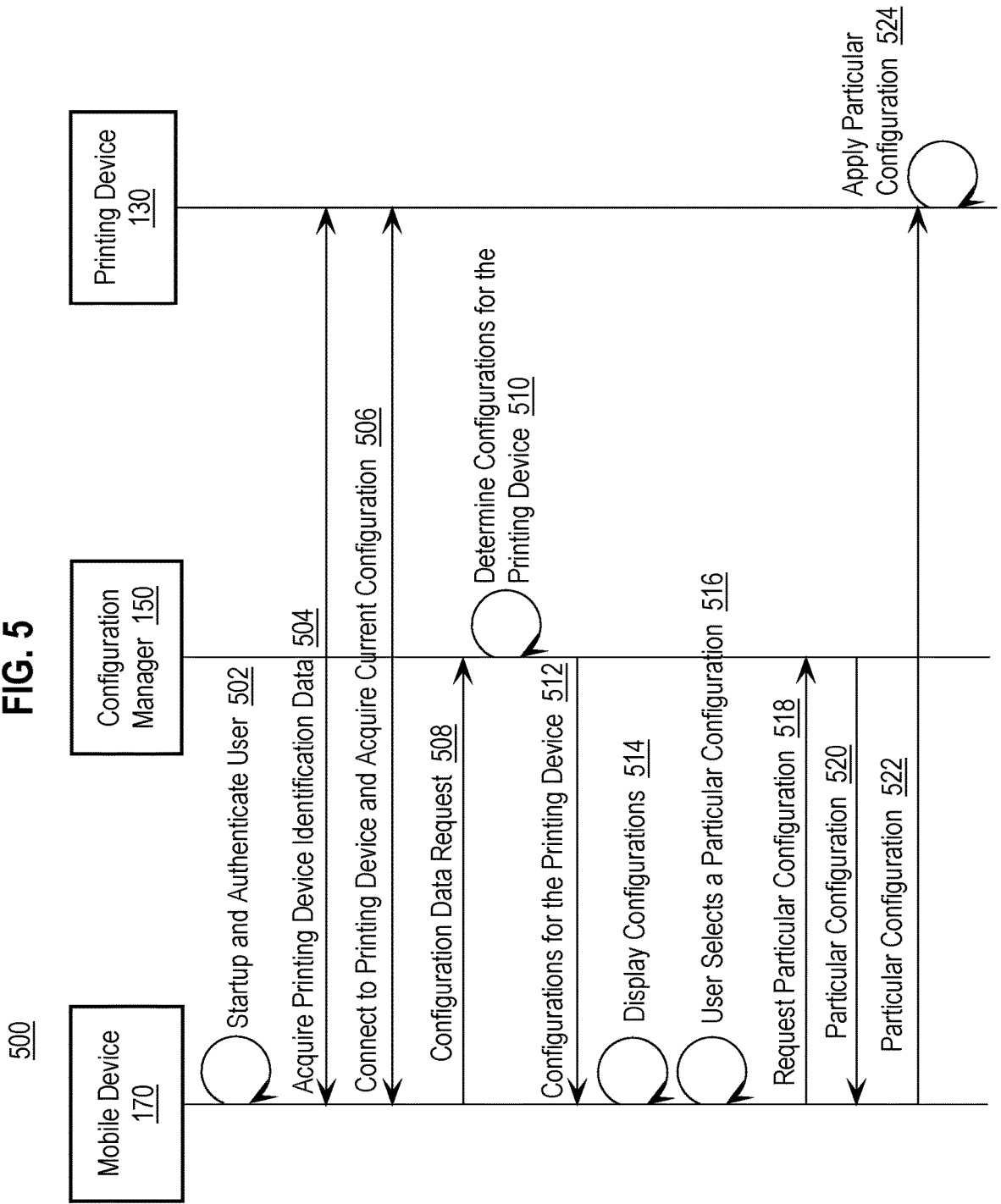

Configure Printing Device:
  Name:   Accounting Dept #1
  Serial Number:  SN8
  Location:  Green conference room

|  | Rating | Select |
|---|---|---|
| Last Configuration: C1MS | 87% | ☐ |
|   Description: medium security | | |
| Warning! Configuration has changed | | |
| Recommended Configuration: C1HS | 94% | ☐ |
|   Description: high security | | |
| Other Configurations: C2 | 67% | ☐ |
|   Description: low security | | |
|                     C3 | 84% | ☐ |
|   Description: basic configuration | | |

[ Apply Selected Configuration ]    [ Cancel ]

CONFIGURING PRINTING DEVICES USING A MOBILE DEVICE THAT RECEIVES AND DISPLAY DATA THAT IDENTIFIES A PLURALITY OF CONFIGURATIONS FOR A PRINTING DEVICE AND INDICATES THAT THE CURRENT CONFIGURATION OF THE PRINTING DEVICE HAS CHANGED FROM A PRIOR CONFIGURATION

RELATED APPLICATION DATA

This application is related to U.S. patent application Ser. No. 16/805,651 entitled "CONFIGURING PRINTING DEVICES", filed Feb. 28, 2020 and U.S. patent application Ser. No. 16/805,654 entitled "MANAGING THE CONFIGURATIONS OF PRINTING DEVICES", filed Feb. 28, 2020, the contents all of which are incorporated by reference in their entirety for all purposes as if fully set forth herein.

FIELD

The technical field of the present disclosure relates to configuring printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Printing devices are often sold unconfigured or with a basic configuration that does not have security settings enabled. In addition, printing devices that are sold with security settings enabled may be reconfigured by end users, leaving them in an insecure state. Device management systems are available to enable system administrators to secure, control and maintain the configurations of printing devices. These systems, however, require trained Information Technology (IT) staff. This leaves organizations that do not have dedicated IT staff with printing devices that are vulnerable to third party attacks.

SUMMARY

A mobile device comprises a display, one or more processors, one or more memories, and a configuration application executing on the mobile device. The configuration application is configured to receive, from a configuration manager via one or more computer networks, data that identifies a plurality of configurations for a printing device, wherein each configuration, from the plurality of configurations, specifies a plurality of settings for the printing device. The configuration application causes the data that identifies the plurality of configurations for the printing device to be displayed on the user interface of the mobile device. In response to a user selection of a particular configuration, from the plurality of configurations, the configuration application acquires the particular configuration from the configuration manager and causes the particular configuration to be implemented on the printing device.

The aforementioned approaches may also be implemented by one or more computer-implemented processes and non-transitory computer-readable media that store instructions which, when processed by one or more processed, implement the approach.

BRIEF DESCRIPTION OF THE DRAWINGS

Embodiments are depicted by way of example, and not by way of limitation, in the figures of the accompanying drawings and in which like reference numerals refer to similar elements.

FIG. 4A is a block diagram that depicts configuration selection data, configuration data, and printing device data used by a configuration manager to manage the configuration of printing devices.

FIG. 4B is a block diagram that depicts example configuration selection data managed by the configuration manager.

FIG. 4C is a block diagram that depicts example printing device data managed by the configuration manager.

FIG. 5 is a message ladder diagram that depicts messages exchanged between the elements in arrangement during an initial configuration of the printing device.

FIG. 6 depicts an example configuration screen displayed on the display of the mobile device.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. Overview
II. Printing Device Architecture
  A. Printing Device
  B. ERP System
  C. Configuration Manager
  D. Mobile Device
III. Configuring Printing Devices Using A Mobile Device
IV. Implementation Examples

I. Overview

An approach is provided for configuring printing devices using a mobile device. The mobile device acquires, from a configuration manager, data that identifies a plurality of configurations available for a printing device. The mobile device displays the data and a user selects a configuration for the printing device. The mobile device causes the selected configuration to be applied to the printing device.

As used herein, the term "configuration data" refers to data that specifies settings for printing devices. Example settings include, without limitation, paper/quality settings, effects settings, finishing settings, advanced settings, and security settings. Example security settings include, without limitation, HTTPS settings, IPP settings, TLS settings, encryption settings, FTP settings, WSD settings, RHPP settings, SNMP settings, etc. For example, security settings may pertain to user authentication for accessing a printing device, data overwrite and encryption on printing device storage, disabling certain communications protocols considered to be less secure, etc. As used herein, the term "configuration" refers to settings for a printing device and the term "current configuration" refers to settings currently applied to a printing device.

The approach described herein for configuring printing devices provides a technical solution to the technical problem of how to manage the configuration of printing devices to ensure that printing devices are operating with correct settings. The technical solution provides a user-friendly method for applying and maintaining a consistent and secure printing device configuration without the need for dedicated IT staff. The approach also allows a printing device without an Internet connection (or any network connection) to be configured, which is valuable in high security environments.

II. Printing Device Configuration Architecture

Figure 1:
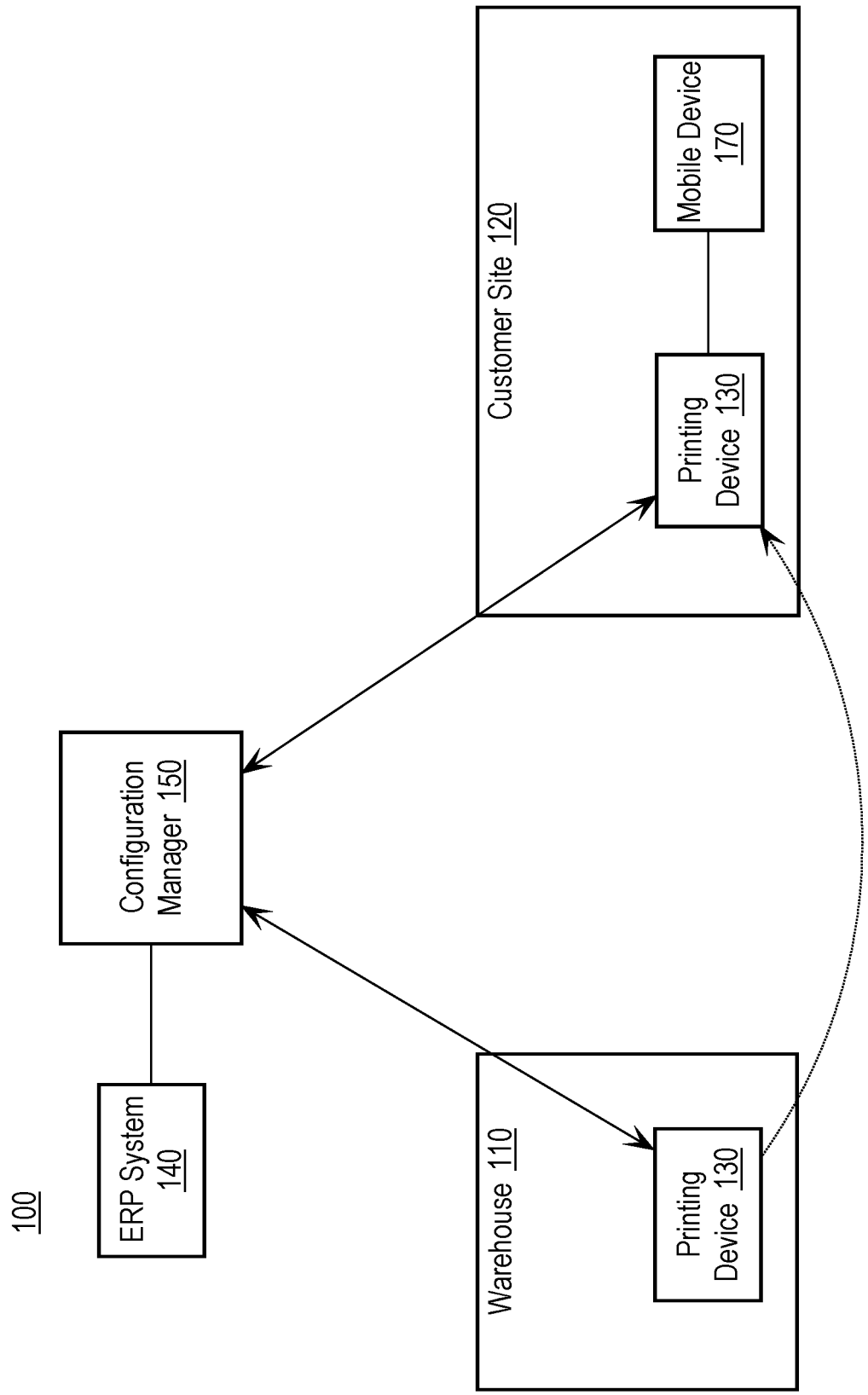
FIG. 1 is a block diagram that depicts a printing device configuration arrangement 100.

FIG. 1 is a block diagram that depicts a printing device configuration arrangement 100. Arrangement 100 includes a warehouse 110, a customer site 120, a printing device 130, an Enterprise Resource Planning (ERP) system 140, and a configuration manager 150. The warehouse 110 is any physical location where the printing device 130 is initially configured prior to being relocated to the customer site 120, as depicted in FIG. 1. The term "warehouse" is used herein for explanation purposes only and the warehouse 110 is not limited to a warehouse per se, and may include other physical locations such as a manufacturer, a distributor, etc. The customer site 120 is any physical location where the printing device 130 is in use. The term "customer site" is used herein for explanation purposes only and the customer site 120 is not limited to a customer site per se and may include other physical locations where the printing device 130 is in use.

The elements of arrangement 100 may be communicatively coupled via one or more wireless and/or wired computer networks of any type, and/or direct communications links that are not depicted in FIG. 1 for purposes of explanation. Arrangement 100 may include additional or fewer elements, depending upon a particular implementation. The approach for configuring printing devices is described in the context of configuring a single printing device 130 for purposes of explanation, but embodiments are applicable to configuring any number of printing devices.

A. Printing Device

Figure 2:
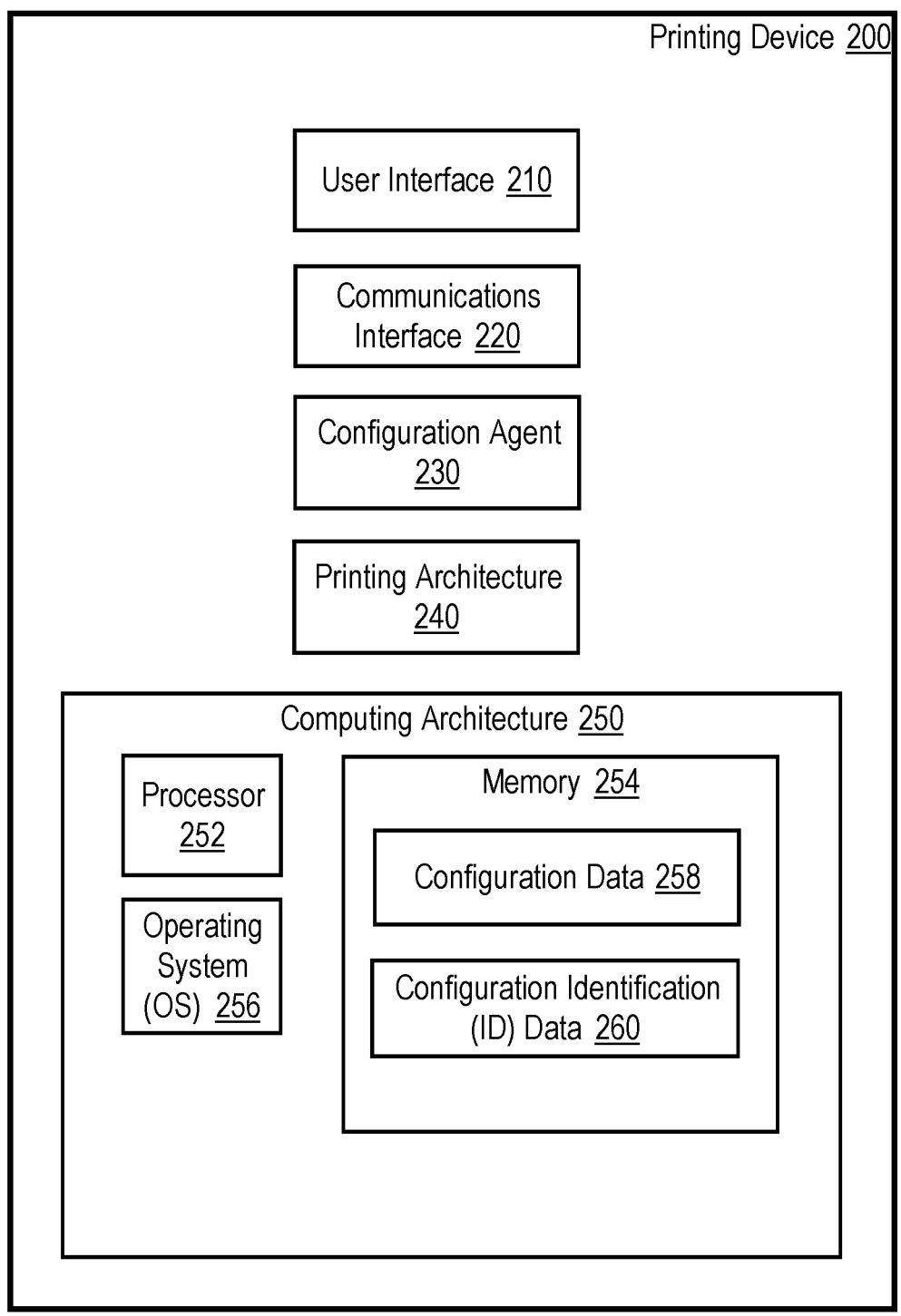
FIG. 2 is a block diagram that depicts an example implementation of a printing device.

The printing device 130 is a device that prints print jobs, such as electronic documents. Embodiments are applicable to any type of printing device and example printing devices include, without limitation, printers, copiers, facsimile machines, and Multi-Function Peripherals (MFPs). FIG. 2 is a block diagram that depicts an example implementation of a printing device 200 that includes a user interface 210, a communications interface 220, a configuration agent 230, a printing architecture 240, and a computing architecture 250.

The user interface 210 allows a user to input information to the printing device 200 and/or displays information to the user. For example, the user interface 210 may be implemented by a display screen, a control panel, a keyboard, a pointing device such as a mouse, or any combination thereof. The user interface 210 may include graphical user interface controls displayed on a touch screen that convey information a user about the functionality and status of the printing device and also allow a user to select functions and input information to the printing device 200.

The communications interface 220 provides for the exchange of data between the printing device 200 and other computing elements via wired, wireless, or direct connections. The configuration agent 230 configures (and reconfigures) the printing device 130 with configuration data, as described in more detail hereinafter. The configuration agent 230 may implement one or more Application Program Interfaces (APIs) supported by the configuration manager 150 and/or communicate with the configuration manager 150 via an HTTP or HTTPS connection. The configuration agent 230 may be implemented by one or more computer-implemented processes of any type. Furthermore, although the configuration agent 230 is depicted as a separate element for discussion purposes, the functionality provided by the configuration agent 230 may be integrated into other processes and/or elements on printing device 200.

The printing architecture 240 includes hardware elements, software elements, or any combination of hardware elements and software elements for printing electronic data, such as print jobs. This may include, for example, a paper transport, logic circuits, a toner cartridge, a photosensitive drum, a laser, one or more coronas, a fuser, an erase lamp, power supply, etc.

The computing architecture 250 includes a processor 252, a memory 254, and an OS 256. The processor 252 may be implemented by one or more microprocessors and associated computer hardware and/or computer software. The memory 254 may be implemented by volatile memory, non-volatile memory, or any combination of volatile and non-volatile memory. The OS 256 may be implemented by any type of operating system that may vary depending upon a particular implementation.

B. ERP System

The ERP system 140 includes data that maps printing devices to customers. The ERP system 140 may include other information, such as sales information, shipping dates, etc. The ERP system 140 may include a database for maintaining this information and a user interface to allow users to access and update the mapping data. The ERP system 140 may also include an interface so that the mapping data can be pushed to the configuration manager 150 or be obtained by the configuration manager 150.

C. Configuration Manager

The configuration manager 150 configures printing devices as described herein. The configuration manager 150 may be implemented by one or more processes, such as a cloud application, a server process, etc. For example, the configuration manager 150 may be a process hosted on a server of a business organization, hosted as a cloud service accessible via the Internet, etc. The configuration manager 150 may provide an Application Program Interface (API) for exposing the functionality and data of the configuration manager 150.

According to an embodiment, the configuration manager 150 uses different types of data to manage the configuration of printing devices. The data may be stored locally on a computing device on which the configuration manager 150 is executing, or remote from the configuration manager 150, for example, in a database management system, data repository, etc. FIG. 4A is a block diagram that depicts configuration selection data 400, configuration data 430, and printing device data 450 used by the configuration manager 150 to manage the configuration of printing devices. The configuration selection data 400, configuration data 430, and printing device data 450 may be maintained in any form or structure, depending upon a particular implementation, and although depicted in the figures and described herein as separate, may be combined in any manner.

The configuration selection data 400 specifies one or more configurations to be used for each type of printing device, for each customer. FIG. 4B is a block diagram that depicts example configuration selection data 400 managed by the configuration manager 150. In this example, there are three customers (Customer A, Customer B, Customer C) and three types of printing devices (Type 1, Type 2, Type 3). There are five standard configurations (C1, C1MS, C1HS, C2, C3) that correspond, respectively, to the three types of printing devices (Type 1, Type 2, Type 3). The standard configurations (C1, C1MS, C1HS, C2, C3) include settings that are appropriate for the corresponding type (Type 1, Type 2, Type 3) of printing device. For example, the standard configurations may include settings that are known to be stable with the corresponding type of printing device.

Custom configurations are specified for certain customers and types of printing devices. These include a custom configuration (Custom B-C1) for Type 1 printing devices for Customer B, and a custom configuration (Custom C-C2) for Type 2 printing device for Customer C. The settings in the custom configurations may be established by customers based upon their operating environment, user preference, policies, etc. For example, a particular customer may implement a configuration that uses security settings to provide greater security than standard configurations. The configuration selection data 400 may include other data that may vary depending upon a particular implementation and embodiments are not limited to the example data depicted in the figures and described herein.

As described in more detail hereinafter, the configuration manager 150 uses the configuration selection data 400 to determine configurations for a printing device to be presented to a user of the mobile device 170. According to an embodiment, multiple configurations are presumed to be listed in priority, from highest to lowest, i.e., the first listed configuration is presented as a recommended configuration and the other configurations are presented as other configurations. For example, for Type 1 printing devices of Customer A, the C1 configuration is presented as the recommended configuration and the C1MS configuration, corresponding to a medium-level security version of configuration C1, is presented as another configuration that is selectable by the user.

The data in the configuration selection data 400 may be updated by a user via the configuration manager 150. For example, a user may use a client device with a Web browser to access a Web-based interface provided by the configuration manager 150. Although examples are described herein in the context of three customers and three types of printing devices, embodiments are not limited to these examples and are applicable to any number of customers and types of printing devices. The configuration selection data 400 may be created and maintained by an administrative user for example, using an application or a Web browser and the API of the configuration manager 150.

The configuration data 430 includes configuration data for any number and types of configurations, where each instance of configuration data includes a plurality of settings for a printing device. The configuration data 430 may also store metadata for each configuration. The metadata may include information such as a description of the configuration, popularity or rating information for the configuration, etc. In the example configuration selection data 400 of FIG. 4B, the configuration selection data 400 includes configuration data for configurations C1, C2, C3, Custom B-C1, and Custom C-C2. The configuration data 430 may be stored in any form or format that may vary depending upon a particular implementation and may be defined by a user via a user interface of the configuration manager 150.

The printing device data 450 specifies data for printing devices including whether each printing device is configured and if so, with which configuration. FIG. 4C is a block diagram that depicts example printing device data 450 managed by the configuration manager 150. In this example, the printing device data 450 is depicted as a table, where each row of the table corresponds to a particular printing device and specifies a Serial Number, a Type, a customer ID, and a Configuration. The Serial Number is a number that uniquely identifies the printing device and although serial numbers are used herein for purposes of explanation, embodiments are not limited to using serial numbers per se and any data the uniquely identifies a printing device may be used. One example is a Media Access Control (MAC) address.

The Type is the type of printing device and in this example may have the value of Type 1, Type 2, or Type 3. The Customer ID is data that identifies an entity that controls or owns the printing device and although used herein for purposes of explanation, embodiments are not limited to Customer IDs per se and any data the uniquely identifies an entity that owns or controls a printing device may be used.

The Configuration is data that identifies the configuration for a printing device and in the present example may have the value of C1, C2, C3, Customer C-C2 or Customer B-C1. A blank or null value in cell means that a configuration has not yet been assigned to the printing device. This may occur, for example, when printing devices are sold to particular customers and corresponding entries created in the printing device data 450, but those printing devices have not yet been configured using the approach described herein.

The configuration manager 150 may provide a Web-based user interface for creating and managing the configuration selection data 400, the configuration data 430, and the printing device data 450. The Web-based user interface allows an administrative user to view the current configuration status of printing devices and to add, edit, and delete printing devices represented by the printing device data 450. For example, the user interface may allow a user of a client device to add a new printing device and specify the serial number, type, customer ID and configuration, if the printing device is already configured. This may be done at any time, for example, when a printing device is sold to a customer, configured at the warehouse 110, or deployed to the customer site 120. If the new printing device is not yet configured, then the administrator does not have to specify a configuration and the printing device will be automatically configured as described herein. The administrative user may also change any of the parameters, including Serial Number, Type, and Customer ID.

Alternatively, configuration selection data 400, the configuration data 430, and the printing device data 450 may be populated based upon data received from third-party systems, such as an Enterprise Resource Planning (ERP) system, or device management systems, such as Streamline NX, by Ricoh. The user interface may also include controls that allow a user to search for printing devices by serial number (or other identifying information), customer ID, printing device type, configuration ID, etc. According to an embodiment, the configuration manager 150 tracks all actions performed with respect to the configuration selection data 400, the configuration data 430, and the printing device data 450.

D. Mobile Device

Figure 3:
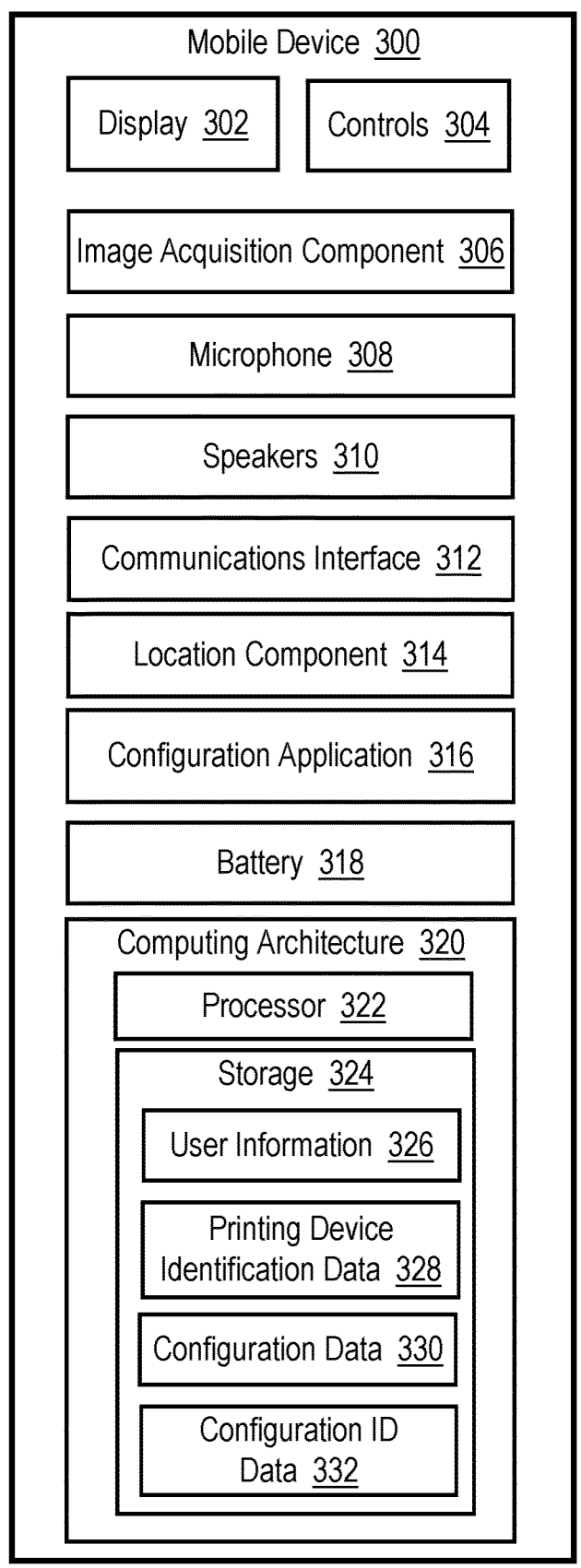
FIG. 3 depicts an example mobile device.

Mobile device 170 is a mobile device that allows a user to configure the printing device 130. FIG. 3 depicts an example embodiment of a mobile device 300 and includes a display 302, controls 304, an image acquisition component 136, a microphone 308, speakers 310, a communications interface 312, a location component 314, a configuration application 316, a battery 318, and a computing architecture 320. Embodiments of mobile device 300 are not limited to the example depicted in FIG. 3 and mobile device 300 may have fewer elements or additional elements, depending upon a particular implementation.

The display 302 allows the mobile device 300 to display information to a user and may be implemented by one or more displays or screens, etc. The display 302 is configured to display text and/or images in black and white and/or color. The display 302 may also be configured to accept user input via a touch screen.

The controls 304 allow a user to provide user input to the mobile device 300 and may include, for example, physical controls such as buttons, sliders, etc., and soft controls, such as graphical user interface objects, displayed on the display 302. Embodiments may also include remote controls. For example, a physical controller, external touchscreen, or other device may include physical or soft controls that allow a user to provide input to the mobile device 300. These devices may communicate with the mobile device 300 via a wired or wireless connection.

The image acquisition component 306 acquires images and generates image data that represents the images. The image acquisition component 306 may include, for example, one or more cameras and associated computer hardware and/or computer software or firmware.

The microphone 308 receives audio input from a user and converts the audio input into electronic signals. According to an embodiment, the mobile device 300 support voice recognition and recognizes spoken commands for controlling the mobile device 300. The speakers 310 converts audio signals into audio output for users.

The communications interface 312 allows the mobile device 300 to communicate with other devices and may be implemented by one or more wireless and/or wired computer communications interfaces to support communications via Bluetooth, BLE, WiFi, WiGig, Near Field Communication (NFC), Infrared Data Association (IrDA), wireless USB, ZigBee, other Wireless Personal Area Network (WPAN) methodologies, mobile device wireless networks, etc.

The location component 314 is an element that determines a current location of mobile device 300. The current location may be determined based upon data from sensors, such as GPS sensors, proximity sensors, etc.

The configuration application 316 allows a user to invoke functionality on printing devices, such as the printing device 130. The configuration application 316 may provide a graphical user interface that includes various controls for invoking functionality on printing device 130. The graphical user interface may mimic information displayed on user interface 112 of printing device 130 to provide a more favorable user experience.

The battery 318 provides electrical power to the mobile device 300 and may include any number of batteries of any type. The computing architecture 320 includes a processor 322 and storage 1324 and supports the execution of computing processes and the storage of data on the mobile device 300. The processor 322 may be one or more computer processors that are capable of executing instructions stored in the storage 324. The storage 324 may be implemented by volatile storage, non-volatile storage, or any combination of volatile and non-volatile storage.

III. Configuring Printing Devices Using a Mobile Device

The approach described herein for configuring a printing device using a mobile device is applicable to printing devices that have not been configured and printing devices that have already been initially configured. Embodiments are depicted in the figures and described herein in the context of a printing device that has been initially configured at the warehouse 110 and then configured using the mobile device 170 at the customer site 120, but embodiments are not limited to this example and the initial configuration and subsequent configuration may be performed at any location. The initial configuration may be performed, for example, using a printing device management system.

FIG. 5 is a message ladder diagram 500 that depicts messages exchanged between the elements in arrangement 100 during configuring the printing device 130 using the mobile device 170. Starting in step 502, the configuration application 316 on the mobile device starts and a user of the mobile device 170 is authenticated. For example, the user of the mobile device 170 may select an icon for the configuration application 316 to start the configuration application 316. The configuration application 316 then queries the user to authenticate themselves. Authentication of the user may be performed in different ways depending upon a particular implementation. For example, the user may enter user information in the form of a user ID and password, a fingerprint, a voice capture, a face capture, etc. The user information is validated locally by the mobile device 170, by the configuration manager 150, or by an authentication service using, for example, a customer-specific database, a global user data, or an external directory such as Active Directory or LDAP. An authentication service may issue an authentication key that is provided to the mobile device 170 and compared to an authentication key held by the configuration manager 150. The mobile device 170 may store the user information as user information 326 in the storage 324 for future use.

Upon successful authentication of the user, the mobile device 170 displays a start screen that prompts the user to locate themselves near a printing device of interest and in step 504, the mobile device acquires printing device identification data that uniquely identifies the printing device 130. This may be accomplished in different ways depending upon a particular implementation and embodiments are not limited to any particular approach. For example, the mobile device 170 may establish a communications link with the printing device 130 using a short-range communications protocol such as Bluetooth or NFC and retrieve a serial number, MAC address, or other information that uniquely identifies the printing device 130.

As another example, the user may be prompted to orient the mobile device 170 so that the printing device 130 is within the field of view to enable the mobile device 170 to capture an image, using the image acquisition component 306, of encoded printing device identification data attached to the printing device 130 or displayed on the operation panel of the printing device. Examples of encoded printing device identification data include, without limitation, a barcode and a QR code. The mobile device 170 decodes the encoded printing device identification data to recover the printing device identification data.

As yet another example, the mobile device 170 captures an image of an information plate for the printing device 130 and uses optical character recognition to extract the serial number or MAC address, and other information such as the type and model number of the printing device 130. The printing device identification data that uniquely identifies the printing device 130 may be stored as printing device data 328 in the storage 324. After the mobile device has successfully acquired the printing device identification data that uniquely identifies the printing device 130, the configuration application 316 displays a confirmation message to the user.

In step 506, the mobile device 170 connects to the printing device 130 and acquires the current configuration of the printing device 130. The mobile device 170 may connect to the printing device 130 via Wi-Fi (possibly in connection with Ethernet, if the printing device 130 is Ethernet connected), via a direct Wi-Fi connection to the printing device 130 (if the printing device 130 does not otherwise have an active network connection), or via a short-range communications protocol such as Bluetooth or NFC, if Wi-Fi cannot be used. Once connected, the configuration application 316 generates and transmits a request to the configuration agent 230 using, for example, an API provided by the configuration agent 230. Once retrieved, the current configuration of the printing device 130 may be stored as configuration data 330 in the storage 324. The current configuration includes settings currently being used by the printing device 130.

According to an embodiment the mobile device 170 generates current configuration identification data that corresponds to the current configuration of the printing device 130. The current configuration identification data may be, for example, a signature, hash result, checksum value or the like, that is generated using the settings currently being used by the printing device 130. According to an embodiment, after the mobile device 170 has acquired the current configuration of the printing device 130, the mobile device 170 terminates the communications link with the printing device 130.

In step 508, the mobile device 170 establishes a communications link with the configuration manager 150 via, for example, a local Wi-Fi or Internet connection or through a mobile network and transmits a configuration data request to the configuration manager 150. For example, the configuration application 316 causes a configuration data request to be generated and transmitted to the configuration manager 150. The configuration data request may be in any form or format that may vary depending upon a particular implementation, such as an HTTPS request and includes information about the printing device 130, such as the printing device identification data, type and/or model number, and the current configuration identification data to allow the configuration manager 150 to determine whether the current configuration of the printing device 130 has changed, as described in more detail hereinafter. Alternatively, instead of or in addition to the current configuration identification data, the request may include the current settings being used by the printing device 130.

In step 510, the configuration manager 150 determines configurations for the printing device 130. According to an embodiment, the configuration manager 150 consults the printing device data 450 to identify particular printing device data that corresponds to the printing device identification data included in the configuration data request of step 508. In the present example it is presumed that the printing device identification data specifies a serial number of SN8.

Referring to the printing device data 450 of FIG. 4C, the row that corresponds to the serial number SN8 specifies that the printing device 130 is currently configured with the C1MS configuration. The C1MS configuration is therefore designated as the current configuration hereinafter. The configuration manager then checks the row for a customer ID and a Type value. In the present example, the row specifies a customer ID of Customer C and a type of Type 1. The configuration manager uses these values to identify a recommended and one or more other configurations from the configuration selection data 400 to present to the user in subsequent steps. In the present example, the configuration selection data 400 for Customer C and Type 1 specifies three configurations that include C1HS, C2, and C3. The C1HS configuration will be provided as the recommended configuration, and the C2 and C3 configurations will be provided as other configurations.

In situations where the printing device data 450 for a particular printing device does not have a value in the Configuration field, indicating that the particular printing device has not yet been configured, and there is no value in the Customer ID field, the configuration manager 150 uses the "No Assigned Customer" portion of the configuration selection data 400 to select the configurations. In situations where there are no values in the Configuration, Customer ID or Type fields of the printing device data 450, then the configuration manager 150 may use model number to device type mapping data, maintained by the configuration manager 150, to identify a type for the printing device based upon the model number received from the mobile device 170. Once the type has been determined, the configuration manager 150 uses the "No Assigned Customer" portion of the configuration selection data 400 to select the configurations.

In step 512, the configuration manager 150 transmits data that identifies the configurations to the mobile device 170. In the present example, the data specifies the C1MS, C1HS, C2, and C3 configurations. The data may specify different types of information that may vary depending upon a particular implementation and embodiments are not limited to any particular information. For example, the information may specify the last configuration implemented on the printing device 130, one or more recommended configurations for the printing device 130, and one or more other configurations for the printing device 130.

The information may also indicate whether the current configuration of the printing device 130 has changed from the last configuration. The configuration manager 150 may determine this by comparing last configuration identification data to the current configuration identification data received from the mobile device 170. The last configuration identification data is a signature, hash result or checksum value generated from the settings specified by the last configuration data, in a similar manner that the mobile device 170 generates the current configuration identification data. If the results are different, then the configuration of the printing device 130 has changed from the last configuration. The information may also include metadata for the printing device 130 from the configuration data 430.

In step 514, the mobile device 170 displays the data that identifies the configurations. FIG. 6 depicts an example configuration screen 600 displayed on the display 302 of the mobile device 170. In this example, the configuration screen 600 includes, at the top, information about the printing device 130 including a name, a serial number, and a location to enable the user to confirm the printing device 130 being configured.

The configuration screen 600 also specifies the last configuration, a recommended configuration, and two other configurations that were determined by the configuration manager 150. The last configuration is the configuration that, according to the printing device data 450 maintained by the configuration manager 150, is currently implemented by the printing device 130. This allows the user to confirm the current configuration being used by the printing device 130 to comply, for example, with a security requirement or a policy. In situations where the printing device 130 has not yet been configured, there is no value for the last configuration. In addition, a message may be displayed to notify the user that the printing device 130 has not yet been configured. In the present example, the C1MS configuration is displayed as the last configuration, the C1HS configuration is displayed as the recommended configuration, and the C2 and C3 configurations are displayed as other configurations.

In the example depicted in FIG. 6, a warning message "Warning! Configuration has changed" is displayed adjacent the last configuration information. This message indicates that the C1MS configuration of the printing device 130 has changed relative to the last configuration maintained by the configuration manager 150. For example, the C1MS configuration of the printing device 130 may have been changed by an end user or by an unauthorized third party (maliciously). The configuration application 316 displays this message in response to the information received from the configuration manager 150 in step 512.

A description is provided for each configuration, along with a rating and a selection control. The rating may be determined from ratings provided by users of the printing device. For example, the displayed rating may represent an average rating across users of the printing device.

In step 516, the user of the mobile device 170 selects a particular configuration. In the present example, the user may select to reapply the current configuration C1MS, select the recommended C1HS configuration, or one of the other configurations C2 or C3. A user may choose to reapply the current C1MS configuration, for example, if the configuration screen 600 indicates that the current configuration has changed. If the current configuration has not changed, indicated by an absence of the warning message, and the user wishes to continue to use the current configuration, then no selection needs to be made. Alternatively, the user may wish to change the configuration of the printing device 130.

In the present example, the user may choose the recommended C1HS configuration to provide greater security via more restrictive security settings. The C1HS configuration may now be the recommended configuration for Customer C Type 1 devices because of, for example, a change in policy by Customer C.

To select and apply a particular configuration the user selects the appropriate checkbox and then the "Apply Selected Configuration" control from the configuration screen 600. In the present example, it is presumed that the user selects the recommended C1HS configuration.

In step 518, the mobile device 170 generates and transmits a request for the particular configuration to the configuration manager 150. For example, the configuration application 316 generates and transmits to the configuration manager 150 a request that requests the C1HS configuration. In step 520, the configuration manager 150 receives the request and provides the particular configuration to the mobile device 170. According to an embodiment, this includes the settings specified by the configuration data for the particular configuration.

In step 520, the mobile device 170 receives the particular configuration from the configuration manager 150 and in step 522, transmits the particular configuration to the printing device 130. For example, the configuration application 316 may generate and transmit a request to the configuration agent 230 on the printing device, where the request instructs the configuration agent 230 to apply the particular configuration, which in the present example is the C1HS configuration. In step 524, the configuration agent 230 applies the particular configuration to the printing device by making one or more calls to the OS 256 to cause the controller on the printing device 130 to apply the settings specified by the particular configuration.

According to an embodiment, the user of the mobile device 170 is allowed to configure only printing devices and configurations that correspond to customers for which the user is authorized access. The configuration manager 150 may maintain data that specifies customers and configurations that users are allowed to access via the user authentication process described herein.

According to an embodiment, the configuration server logs configuration actions performed on the printing device 130. This may include, for example, recording information about changes in configuration, such as the printing device identification data, the current configuration, the new configuration, the time of change, user identification data that identifies the user of the mobile device, mobile device identification data that identifies the mobile device used to change the configuration, etc.

The approach for performing a configuration check and reconfiguration described herein provides several benefits. For example, it allows a printing device to automatically maintain a consistent, secure configuration with minimal involvement of IT personnel. It also allows the configuration of printing devices to be easily changed, even for a large number of printing devices. For example, a customer may decide to change the configuration for certain types of printing devices, e.g., to provide better security. This can be easily accomplished by the customer accessing the configuration manager 150 and updating the printing device data 450 for the customer's printing devices. The configuration agents then automatically update all of the printing devices without requiring IT staff to perform the updates.

IV. Implementation Examples

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that are persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
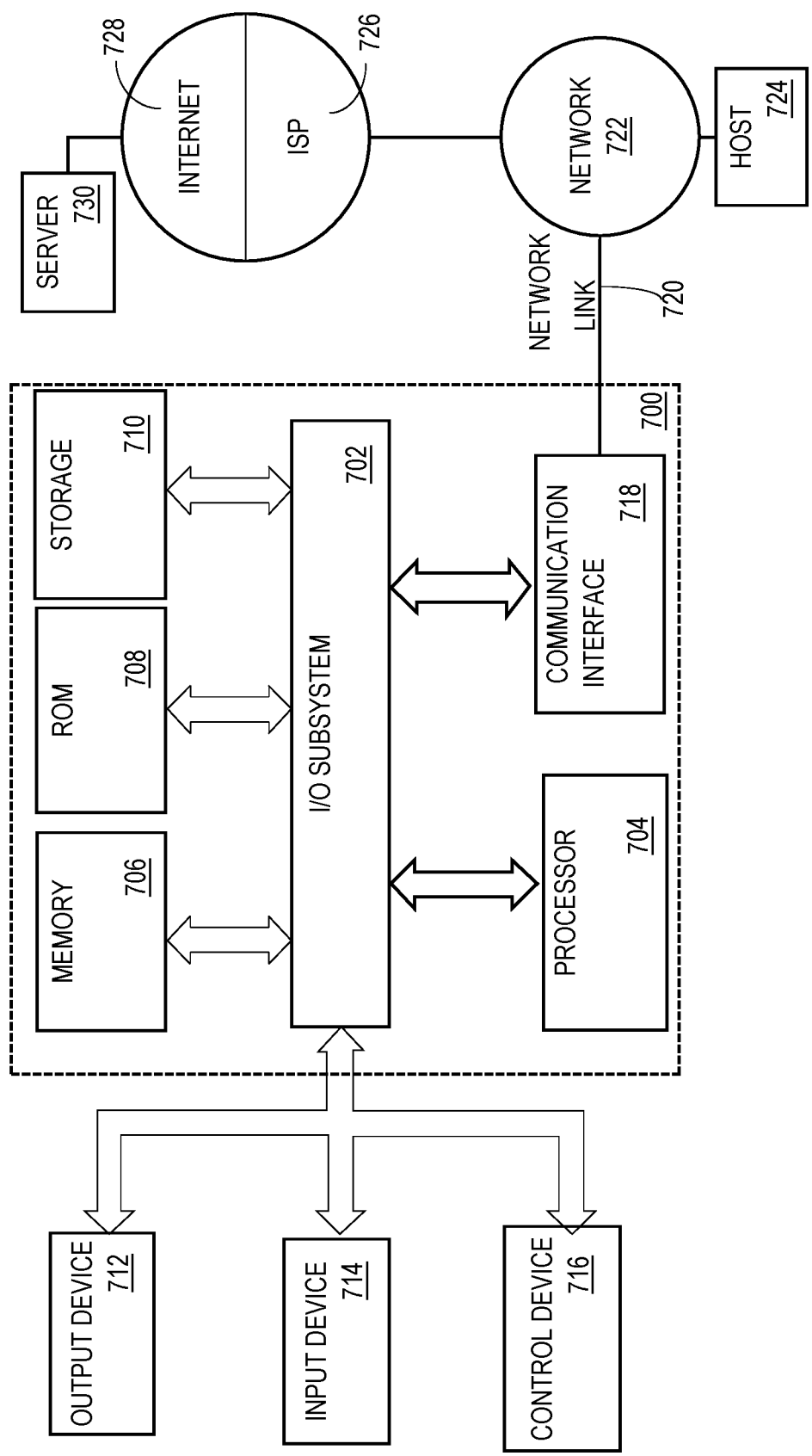
FIG. 7 is a block diagram that depicts an example computer system upon which embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device.

An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The invention claimed is:

1. A mobile device comprising:
  a display;
  one or more processors;
  one or more memories; and
  a configuration application executing on the mobile device and configured to:
    transmit to a configuration manager current configuration identification data that uniquely identifies a current configuration currently being used by a printing device,
    receive, from the configuration manager via one or more computer networks, data that identifies a plurality of configurations for the printing device, wherein each configuration, from the plurality of configurations, specifies a plurality of settings for the printing device, wherein the plurality of configurations for the printing device includes at least a current configuration currently being used by the printing device,
    cause the data that identifies the plurality of configurations for the printing device to be displayed on a user interface of the mobile device,
    in response to receiving a notification from the configuration manager that the current configuration of the printing device has changed from a prior configuration, based upon the configuration manager comparing the current configuration identification data that uniquely identifies the current configuration currently being used by the printing device to last configuration identification data that uniquely identifies a last configuration used by the printing device, causing a visual indication to be displayed on the user interface to notify a user of the mobile device that the current configuration of the printing device has changed from the prior configuration,
    in response to a user selection of a particular configuration, from the plurality of configurations:
      acquire the particular configuration from the configuration manager via the one or more computer networks, and
      cause the particular configuration to be implemented on the printing device.

2. The mobile device as recited in claim 1, wherein the plurality of configurations for a printing device include a recommended configuration and at least one other configuration that is compatible with the printing device.

3. The mobile device as recited in claim 1, wherein:
  the current configuration identification data uniquely corresponds to a plurality of settings currently being used by the printing device, and
  the configuration application executing on the mobile device is configured to generate and transmit to the configuration manager a request for configuration data that includes data that identifies the printing device and the current configuration identification data uniquely corresponds to the plurality of settings currently being used by the printing device.

4. The mobile device as recited in claim 3, wherein the current configuration identification data that uniquely corresponds to the current plurality of settings being used by the printing device is one or more of signature data, one or more or hash results data, or a checksum value generated based upon the current plurality of settings being used by the printing device.

5. The mobile device as recited in claim 1, wherein the configuration application executing on the mobile device is configured to generate and transmit to the configuration manager a request for configuration data that includes printing device identification data that uniquely identifies the printing device and a model or type of the printing device, wherein the configuration manager uses the printing device identification data and the model or type of the printing device to determine the plurality of configurations for the printing device.

6. The mobile device as recited in claim 5, wherein the printing device identification data is one or more of: retrieved by the configuration application communicating with the printing device, acquiring an image of encoded data for the printing device and decoding the encoded data, or acquiring an image of the printing device identification data and using optical character recognition to obtain the printing device identification data.

7. One or more non-transitory computer-readable media storing instructions which, when processed by one or more processors, cause:
   a configuration application executing on a mobile device to:
      transmit to a configuration manager current configuration identification data that uniquely identifies a current configuration currently being used by a printing device,
      receive, from the configuration manager via one or more computer networks, data that identifies a plurality of configurations for the printing device, wherein each configuration, from the plurality of configurations, specifies a plurality of settings for the printing device, wherein the plurality of configurations for the printing device includes at least a current configuration currently being used by the printing device,
      cause the data that identifies the plurality of configurations for the printing device to be displayed on a user interface of the mobile device,
      in response to receiving a notification from the configuration manager that the current configuration of the printing device has changed from a prior configuration, based upon the configuration manager comparing the current configuration identification data that uniquely identifies the current configuration currently being used by the printing device to last configuration identification data that uniquely identifies a last configuration used by the printing device, causing a visual indication to be displayed on the user interface to notify a user of the mobile device that the current configuration of the printing device has changed from the prior configuration,
      in response to a user selection of a particular configuration, from the plurality of configurations:
         acquire the particular configuration from the configuration manager via the one or more computer networks, and
         cause the particular configuration to be implemented on the printing device.

8. The one or more non-transitory computer-readable media as recited in claim 7, wherein the plurality of configurations for a printing device include a recommended configuration, and at least one other configuration that is compatible with the printing device.

9. The one or more non-transitory computer-readable media as recited in claim 7, wherein:
   the current configuration identification data uniquely corresponds to a plurality of settings currently being used by the printing device, and
   wherein processing of the instructions by the one or more processors further causes the configuration application executing on the mobile device to generate and transmit to the configuration manager a request for configuration data that includes data that identifies the printing device and the current configuration identification data uniquely corresponds to the plurality of settings currently being used by the printing device.

10. The one or more non-transitory computer-readable media as recited in claim 9, wherein the current configuration identification data that uniquely corresponds to the current plurality of settings being used by the printing device is one or more of signature data, one or more or hash results data, or a checksum value generated based upon the current plurality of settings being used by the printing device.

11. The one or more non-transitory computer-readable media as recited in claim 7, wherein processing of the instructions by the one or more processors further causes the configuration application executing on the mobile device to generate and transmit to the configuration manager a request for configuration data that includes printing device identification data that uniquely identifies the printing device and a model or type of the printing device, wherein the configuration manager uses the printing device identification data and the model or type of the printing device to determine the plurality of configurations for the printing device.

12. The one or more non-transitory computer-readable media as recited in claim 11, wherein the printing device identification data is one or more of:
   retrieved by the configuration application communicating with the printing device, acquiring an image of encoded data for the printing device and decoding the encoded data, or acquiring an image of the printing device identification data and using optical character recognition to obtain the printing device identification data.

13. A computer-implemented method comprising:
   a configuration application executing on a mobile device:
      transmitting to the configuration manager current configuration identification data that uniquely identifies a current configuration currently being used by a printing device,
      receiving, from the configuration manager via one or more computer networks, data that identifies a plurality of configurations for the printing device, wherein each configuration, from the plurality of configurations, specifies a plurality of settings for the printing device, wherein the plurality of configurations for the printing device includes at least a current configuration currently being used by the printing device,
      causing the data that identifies the plurality of configurations for the printing device to be displayed on a user interface of the mobile device,
      in response to receiving a notification from the configuration manager that the current configuration of the printing device has changed from a prior configuration, based upon the configuration manager comparing the current configuration identification data that uniquely identifies the current configuration currently being used by the printing device to last configuration identification data that uniquely identifies a last configuration used by the printing device, causing a visual indication to be displayed on the user interface to notify a user of the mobile device that the current configuration of the printing device has changed from the prior configuration,
      in response to a user selection of a particular configuration, from the plurality of configurations:
         acquiring the particular configuration from the configuration manager via the one or more computer networks, and causing the particular configuration to be implemented on the printing device.

14. The computer-implemented method as recited in claim 13, wherein the plurality of configurations for a printing device include a recommended configuration and at least one other configuration that is compatible with the printing device.

15. The computer-implemented method as recited in claim 13, wherein:
the current configuration identification data uniquely corresponds to a plurality of settings currently being used by the printing device, and
the computer-implemented method further comprises the configuration application executing on the mobile device generating and transmitting to the configuration manager a request for configuration data that includes data that identifies the printing device and the current configuration identification data uniquely corresponds to the plurality of settings currently being used by the printing device.

16. The computer-implemented method as recited in claim 15, wherein the current configuration identification data that uniquely corresponds to the current plurality of settings being used by the printing device is one or more of signature data, one or more or hash results data, or a checksum value generated based upon the current plurality of settings being used by the printing device.

17. The computer-implemented method as recited in claim 13, further comprising the configuration application executing on the mobile device generating and transmitting to the configuration manager a request for configuration data that includes printing device identification data that uniquely identifies the printing device and a model or type of the printing device, wherein the configuration manager uses the printing device identification data and the model or type of the printing device to determine the plurality of configurations for the printing device.

* * * * *